United States Patent

[11] 3,624,524

| [72] | Inventor | Joseph E. Bryden<br>Framingham, Mass. |
|---|---|---|
| [21] | Appl. No. | 757,422 |
| [22] | Filed | Sept. 4, 1968 |
| [45] | Patented | Nov. 30, 1971 |
| [73] | Assignee | Raytheon Company<br>Lexington, Mass. |

[54] ANALOG CHARACTER GENERATOR
11 Claims, 14 Drawing Figs.

[52] U.S. Cl. .................................................. 328/143,
235/197, 307/229, 328/164, 328/158
[51] Int. Cl. .................................................. G06k 3/00
[50] Field of Search .......................................... 328/164,
143, 157; 235/197; 307/229

[56] References Cited
UNITED STATES PATENTS

| 2,831,107 | 4/1958 | Raymond | 307/229 |
| 3,289,195 | 11/1966 | Townsend | 235/197 |
| 3,320,409 | 5/1967 | Larrowe | 235/197 |
| 3,500,212 | 3/1970 | Berg | 235/197 |

*Primary Examiner*—Donald D. Forrer
*Assistant Examiner*—Harold A. Dixon
*Attorneys*—Joseph D. Pannone and Harold A. Murphy ABSTRACT: An analog character generator which continuously generates X- and Y-position signals to write symbols and a brightness unblanking signal. The selected symbol waveforms are approximated by joining a number of points by straight line segments. Each straight line segment is generated by using displaced triangular voltage waveforms sequentially applied to input resistors of a summing amplifier. The straight line segment joining two points of a waveform is produced by summing the correct proportions of a positive and negative going ramp. Segment commutation is achieved by gating the triangular pulse train with switching actually taking place when the waveform is at zero, which minimizes ringing and other spurious effects.

FIG. 1

INVENTOR
JOSEPH E. BRYDEN
BY Irving S. Rappaport
ATTORNEY

FIG. 6A SEGMENT CLOCK PULSE

FIG. 6B SYMBOL START PULSE

FIG. 6C PHASE B SQUARE WAVE

FIG. 6D PHASE B TRIANGULAR PULSE

FIG. 6E PHASE A SQUARE WAVE

FIG. 6F PHASE A TRIANGULAR PULSE

FIG. 6G BRIGHTNESS COMMUTATION

FIG. 6H X & Y GATE COMMUTATION

INVENTOR
JOSEPH E. BRYDEN
BY Irving S. Rappaport
ATTORNEY

FIG. 7

INVENTOR
JOSEPH E. BRYDEN
BY Irving S. Rappaport
ATTORNEY

ANALOG CHARACTER GENERATOR

BACKGROUND OF THE INVENTION

Prior art analog character generators employ the technique of approximating a character by a number of short straight lines, otherwise known as segmentation. Various approaches including ramp selection, combining ramps of different slopes, and resistance switching are used to generate X- and Y-position signals for approximating the desired characters. However, these prior art systems have many deficiencies. For example, it is desirable to be able to control and vary the size of the symbol being generated in a very simple manner. Also, prior art systems do not have a constant writing speed, thereby requiring additional brightness compensation circuits to cope with symbols of different size. Many prior art systems do not permit accurate determination of the terminal amplitudes of each segment and do not allow for operation over a wide range of symbol speeds. Such systems are often plagued by ringing and other spurious effects and gaps may occur between the line segments.

The analog character generator of the present invention overcomes these deficiencies of the prior art by providing the following features and advantages as well as others: (1) Displaced triangular waveforms are sequentially applied to input resistors of a summing amplifier and a straight line joining two points of a waveform is produced by summing the correct proportions of a positive and a negative going ramp. (2) The size of a symbol being generated may be controlled simply by the segment period ($T_S$). The display writing speed may be maintained constant, thus avoiding special brightness compensation circuits to cope with different sized symbols. (3) The terminal amplitudes of each segment may be accurately determined. (4) One basic design of symbol generator can operate over a wide range of symbol speeds. (5) With the addition of a small amount of logic, the symbol generator may be designed to have a variable symbol periodicity; simple characters would be allowed fewer segments than more complex ones. Such a technique offers potential savings in "nonwriting" time, which may be traded for higher brightness, increased data capacity, or slower major deflection speeds. (6) Segment commutation is achieved by gating a triangular pulse train, the actual switching taking place when the waveform is at zero. This minimizes ringing and other spurious effects. (7) Input resistance values to the summing amplifiers precisely determine the end positions of each segment. This makes character waveform synthesis easy and ensures no gaps between line segments.

SUMMARY OF THE INVENTION

The above advantages and objects of the present invention, as well as others, are achieved by providing an analog character generator comprising; means for generating a pair of triangular waveforms displaced from each other in phase, means for gating the waveforms so as to commutate them into separate X- and Y-axis signals, means for separately and sequentially summing the gated X- and Y-axis signals, means coupled to the outputs of the summing means for selecting the character segments to be generated, means for providing an output which contains signals representing straight line segments joining two points of a waveform resulting from summing the correct proportions of the positive and negative going ramps of the triangular waveforms, and means coupled to said output means for controlling the brightness of the line segments.

DESCRIPTION OF THE PREFERRED EMBODIMENTS

Figure 1:
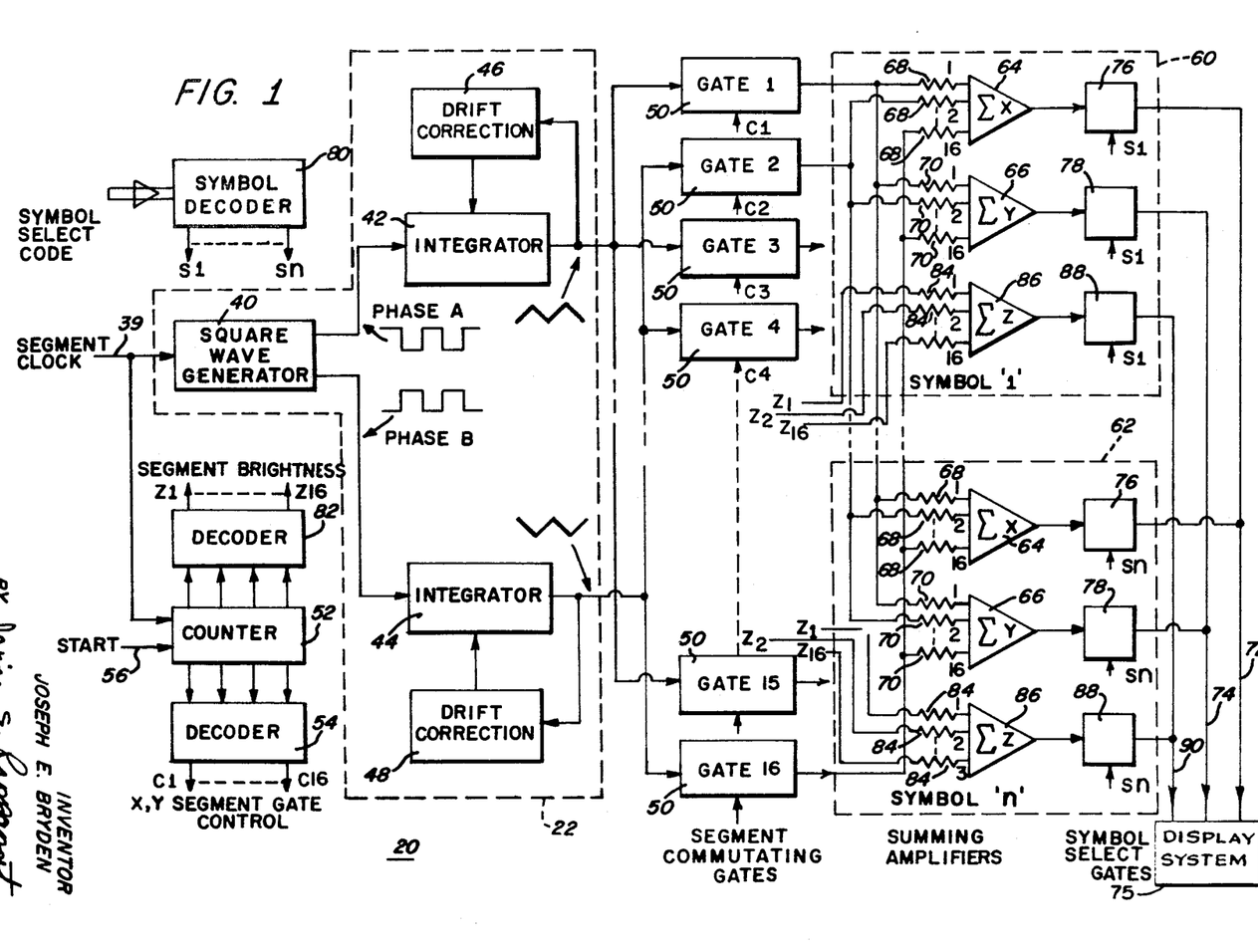
FIG. 1 is a block diagram of one embodiment of the generator of the present invention.

An analog character generator 20 is shown in FIG. 1. It continuously generates X- and Y-position signals to write symbols, and a brightness unblanking signal Z. The required symbol waveforms are approximated by joining a number of points by straight lines. For example, in the embodiment shown in FIG. 1, a maximum of 17 segments may be used for each symbol. Sixteen segments are used in generating the character and the 17th provides for the return to zero. Each segment is generated by X and Y ramps joining two points which may be determined with any required accuracy by selection of resistance values.

Figure 2:
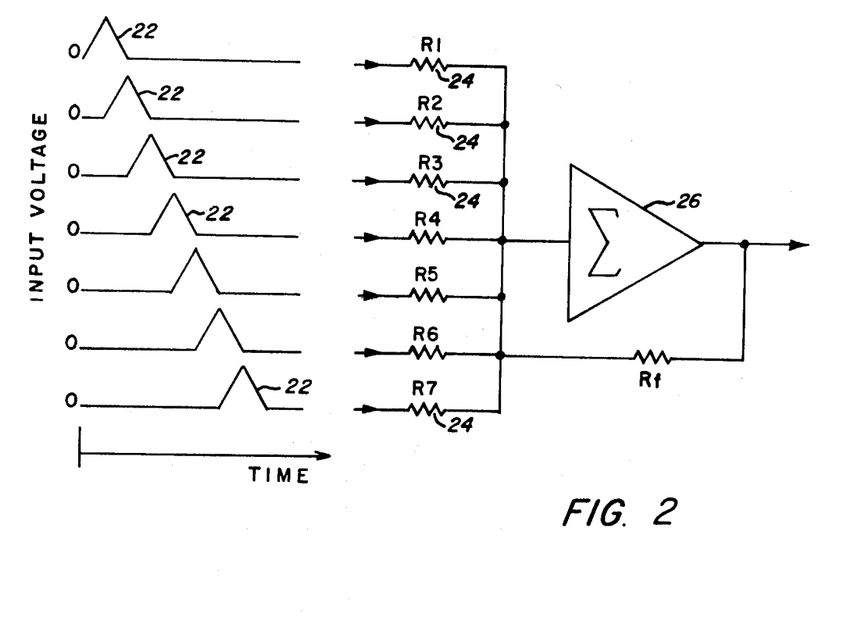
FIG. 2 is a circuit diagram used in illustrating the principle upon which the present invention operates.
Figure 3:
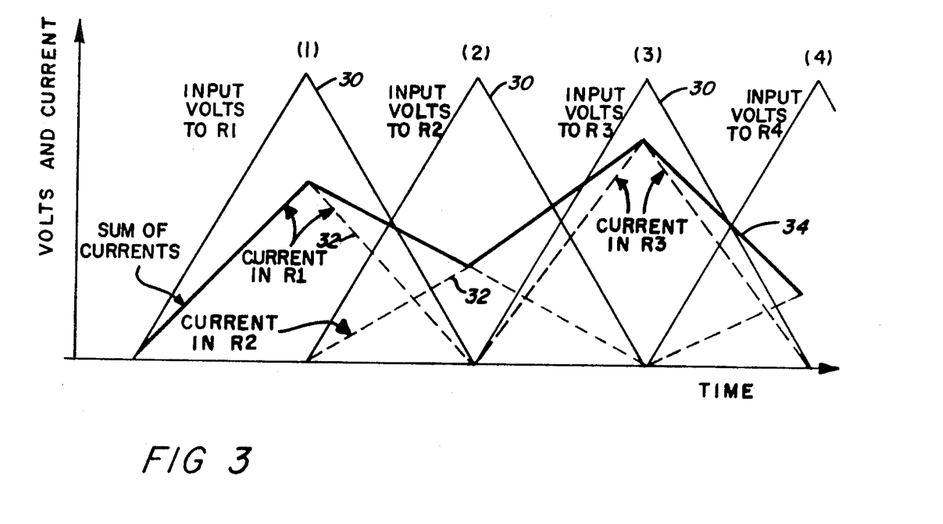
FIG. 3 is a composite plot illustrating the principle upon which operation of the present invention is based.

The principle of generating the required waveform is illustrated by FIGS. 2 and 3. In FIG. 2 a series of identical isosceles triangular pulses 22 are applied to separate input resistors 24 of a summing amplifier 26. These pulses 22 overlap by half their width. The output voltage from the summing amplifier 26 is equal to $$\sum V_{R_1}\left(\frac{R_f}{R_1}\right) + V_{R_2}\left(\frac{R_f}{R_2}\right) + \ldots V_{R_7}\left(\frac{R_f}{R_7}\right)$$

which is the sum of the voltages across the input resistors multiplied by the individual ratios of the feedback resistor $R_f$ to the individual input resistors.

It will be observed, from FIGS. 2 and 3 that only two pulses 22 can occur at the same time. Each resistor 24 determines the end-point amplitude of its segment and then linearly falls to zero in the same time interval that the pulse for the next segment rises from zero to maximum. The resultant of this is shown in FIG. 3 where the sum of the currents from the resistors 24 is a series of ramps connecting the segment endpoint amplitudes. An analog waveform may be generated with any required degree of accuracy by having enough segments. The triangular waveforms 30 represent the input voltages to each of the resistors 24. The dotted triangular waveforms 32 represent the currents in each of the resistors 24. The sum of the currents in the resistors 24 is shown by the heavy wave 34.

Figure 4:
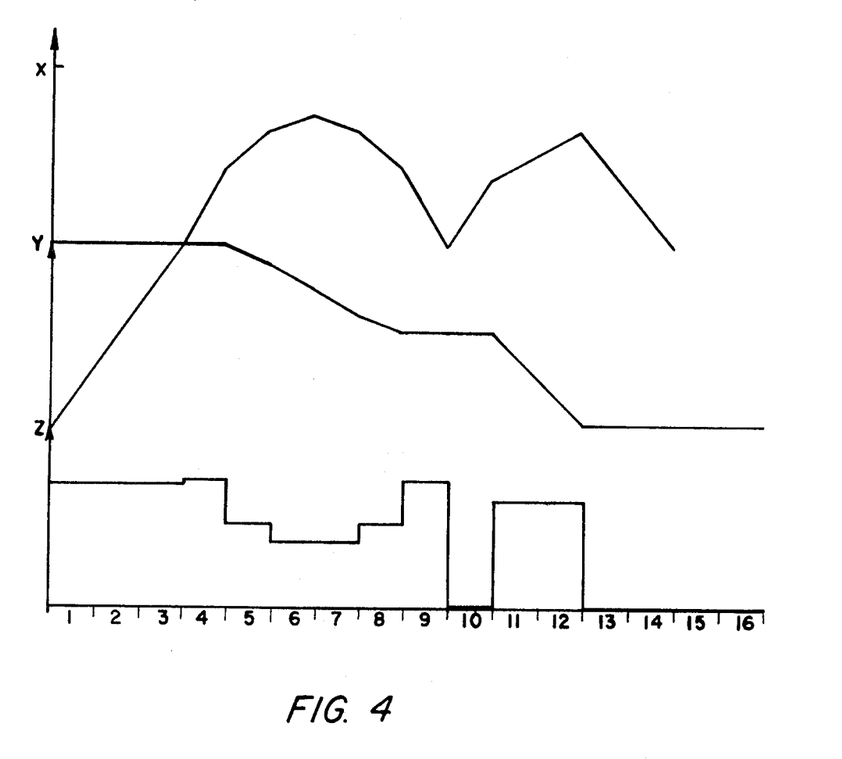
FIG. 4 shows how the waveforms are combined in the present invention to generate a character.
Figure 5:
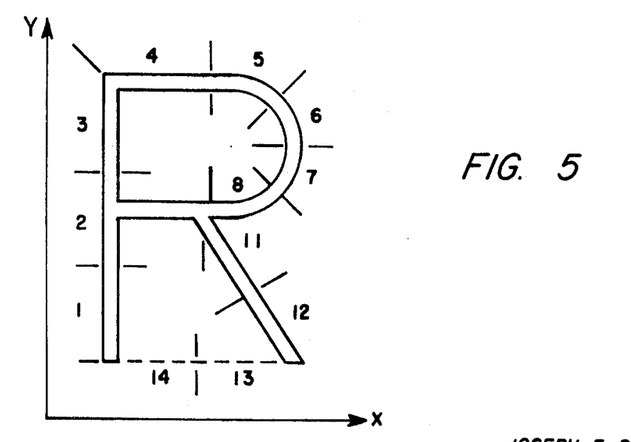
FIG. 5 shows the character generated by the waveforms of FIG. 4.

FIG. 4 shows how the X-, Y-, and Z-waveforms combine to generate a letter R shown in FIG. 5. Separate waveform generators of the form shown in FIG. 2 are required for the X- and Y-axes. Precise control of brightness Z for each segment is obtained from another amplifier receiving a constant input voltage stepped to each of the selected input resistors 24 in turn.

FIG. 1 shows a block schematic diagram of a character generator 20 embodying the technique described in conjunction with FIGS. 2-5. In this embodiment, the symbols are constructed from a maximum of 17 segments with the waveforms starting from the returning to zero. A segment period ($T_S$) of 150 nanoseconds is employed which gives a character period of 2.4 microseconds (the 17th segment is for return to zero, and is blanked). The base widths of the triangular pulses used are 300 nanoseconds. FIGS. 6A-H show timing diagrams for five of the segments generated by the character generator 20.

Figure 6A:
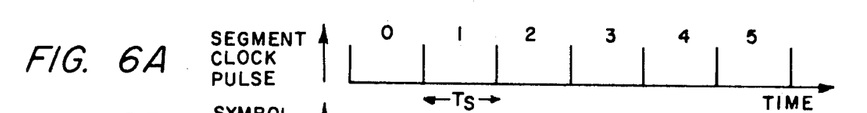
FIGS. 6A-H show timing diagrams for several segments making up the generation of a character.
Figure 6B:
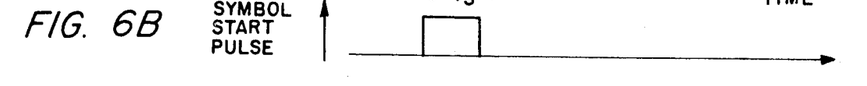
Figure 6C:
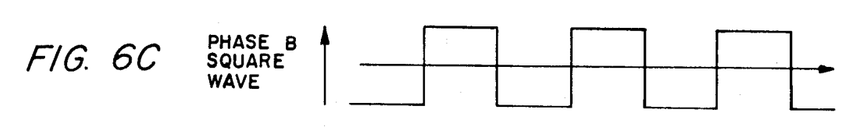
Figure 6D:
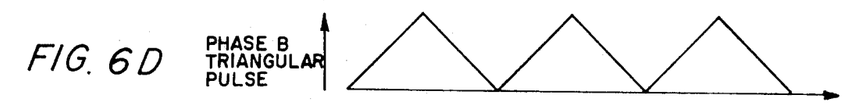
Figure 6E:
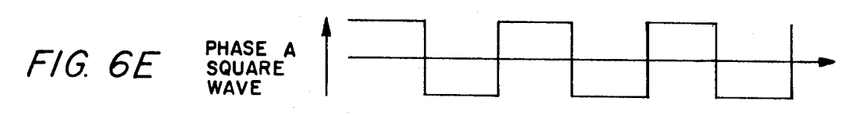
Figure 6F:
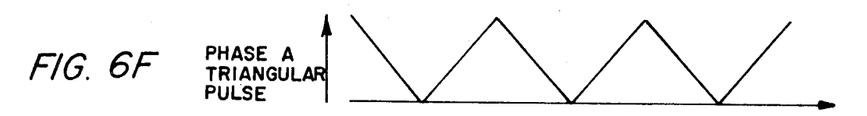
Figure 6G:
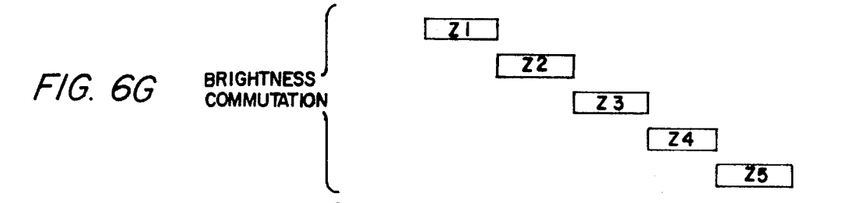
Figure 6H:
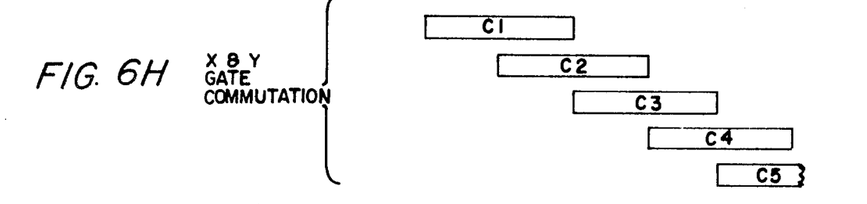

An input pulse train of 6.7 mh. which sets as a segment clock on a line 39 is applied to means for generating triangular waveforms displaced in phase which is shown in dotted block 22. The clock triggers a square wave generator 40 which generates square waves with a periodicity $T_S$ of 300 nanoseconds as seen in FIG. 6A. There are two bipolar outputs of opposite phase—phases A and B which are shown in FIGS. 6E and C respectively. Each bipolar square wave switches two constant current sources (not shown) in an integrator. The phase A square wave is integrated in integrator 42 and the phase B square wave is integrated in integrator 44. These sources charge and discharge a capacitor (not shown)

to produce a triangular waveform. The phase A and phase B triangular waveforms which are derived from integrators 42 and 44 respectively are shown in FIGS. 6F and D respectively. Each integrator includes a loop for correcting the DC drift which will occur if the charging and discharging currents and times are not precisely equal. Integrator 42 has a loop including drift correction circuit 46, and integrator 44 has a loop including drift correction circuit 48.

The two integrators 42 and 44 (phases A and B) produce two continuous triangular waveform trains which overlap in time as seen in FIGS. 6F and D. The outputs from integrators 42 and 44 are fed to 16 gates 50 labeled consecutively gates 1-16 which act as a commutator to deliver the triangular pulses to groups of segment resistors, in turn. The triangular waveform from integrator 42 is fed to the odd numbered gates 50, i.e. gates 1, 3, 5, 7, 9, 11, 13 and 15 while the triangular waveform from integrator 44 is fed to the even numbered gates 50, i.e. gates 2, 4, 6, 8, 10, 12, 14 and 16.

The control for the commutating gates 50 is obtained from a $2^4$ counter 54 and a decoder 54 (or serial shift register). The counter 52 is driven from the 6.7 MHz. pulse train on line 39. The counter 52 is started by a separate control line 56 on which a start pulse as shown in FIG. 6B is applied whenever a symbol is required, and at the end of the symbol the counting is arrested. The outputs from the four stages of the counter 52 are decoded by decoder 54 to open the commutating gates 50, two at a time. The outputs C1-C16 of the decoder 54 are applied to the respective gates 50 as shown in FIG. 1. On completion of the last segment period, the gates 50 are all cutoff.

Each different symbol has three waveform generators of the type shown in FIG. 2 associated therewith. Separate generators are required for the X-, Y- and Z-signals. FIG. 1 shows dotted blocks 60 and 62 each of which represents the generating circuitry necessary for generating their respective symbols $l$ and $n$. For each symbol $l$ through $n$ there are separate summing amplifiers 64 and 66 for the X- and Y-signals respectively. Each amplifier 64 and 66 sums 16 inputs which are active in pairs. The inputs to each of the summing amplifiers 64 and 66 are from all of the gates 50 via 16 input resistors 68 and 70 respectively. The 16 resistors 68 are connected to each X-axis summing amplifier 64 while the 16 resistors 70 are connected to each Y-axis summing amplifier 66. Each of the resistors 68 and 70 is connected to a respective gate 50. The outputs of the amplifiers, selected for a particular symbol, are connected to the X- and Y-output bus bars 72 and 74 respectively for coupling to a conventional display system 75 by gates 76 and 78 respectively which are controlled by a symbol decoder 80. The input to decoder 80 is a symbol select code and the outputs $Sl$ through $Sn$ corresponding to each of the symbols are applied to the gates 76 and 78 as shown.

A separate decoder 82, also connected to the counter 52, is used to generate the brightness commutation rectangular pulses for controlling brightness Z. These pulses Z1 through Z16 are fed to each of 16 resistors 84 of all the amplifiers 86 to produce the required segment brightness control signal. A gate 88 connects the required symbol signal to the Z output bus bar 90 for coupling to the display 75. The gates 76, 78 and 88 for selecting symbols which are controlled by the symbol decoder 80, need not be fast because they can be setup before the segment counter 52 is started, and after the symbol has been completed.

The output bus bars 72, 74, and 90 are connected to line amplifiers (not shown) for transmission to the display (not shown). Some easement of the DC levels and drift tolerances may be obtained by AC coupling at the input to the line amplifiers and using clamped DC restoration during the intervals between characters.

FIG. 6 is an idealized timing diagram and does not show setup and access time losses. If the square wave inputs to the integrators 42 and 44 are generated continuously, the first segment can only occur on alternate clock pulses. Therefore, the counter 52 must be started on the correct pulse. This is easily accomplished by placing START pulses in consecutive clock periods and selecting the appropriate one by the square wave in the AND gate. There will be a maximum starting delay of 300 nanoseconds, or an average delay of about 150 nanoseconds. A preferable arrangement, which avoids a starting delay, is to run the square wave only when it is required by sending a burst of clock pulses with the START signal on line 56. FIG. 6G shows the brightness commutation of the five segments and FIG. 6H shows the results of the X- and Y-gate commutation. The symbol decoding in decoder 80 will take approximately 100 nanoseconds, and can take place while the last segment (17th segment, during which the ramp returns to zero) is being generated. On completion of the last segment, a DC restoration pulse is generated for eliminating drift in the line amplifiers. The restoration pulse may last for a minimum of 100 nanoseconds and during this time the counter 52 is made ready to commence commutation for the next symbol. The instants of switching in the segment gates 50 are correctly timed to the zero amplitudes of the triangular waveforms with an accuracy of not less than ±5 percent of $T_S$.

Some economy of X- and Y-amplifiers 76 and 78 is possible by taking advantage of the similarity of writing patterns for groups of characters, and only unblanking the beam for the appropriate segments. For example, the letters F, E, H and L may be produced by the same X- and Y-waveforms, but with different unblanking signals.

Figure 7:
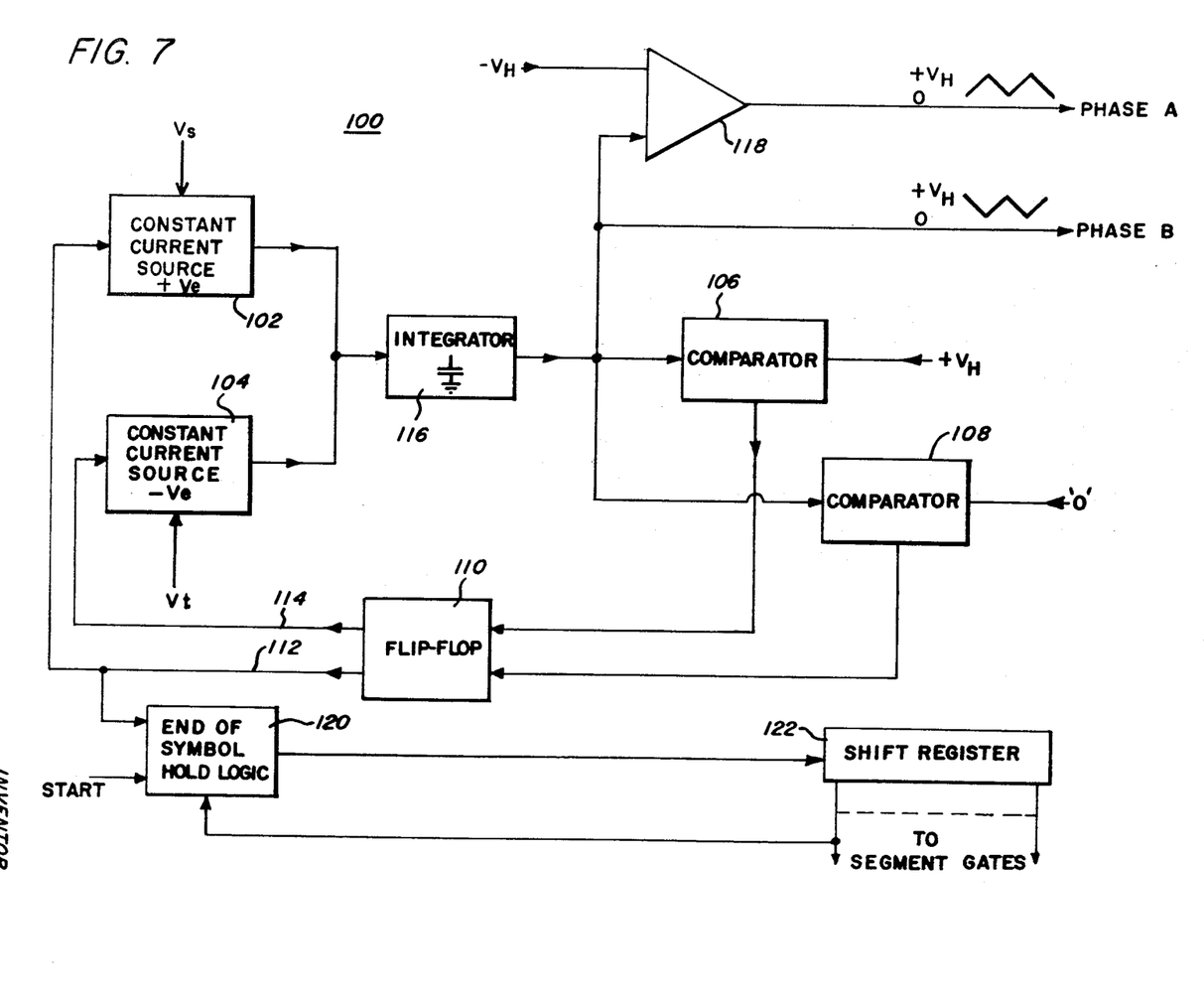
FIG. 7 shows a block diagram of an alternative structure for a portion of the system shown in FIG. 1.

FIG. 7 discloses an alternative embodiment for generating the triangular waveforms generated by the circuit in the dotted block 22 in FIG. 1. This alternative embodiment provides a self-running clock and allows character size to be changed by a voltage $V_H$. In this embodiment, the symbols may be generated with a constant writing speed or with only a slight variable periodicity. The advantage of generating the X- and Y-waveforms to produce a constant rate of deflection of the cathode-ray tube spot is that it is not necessary to control the beam current to provide intensity compensation. With constant writing speed, the beam is either on or off.

In the embodiment of the invention shown in FIG. 1, all the triangular pulses are isosceles and have identical periods (for a single sized character). Having this constraint, the characters are constructed from straight lines which must vary in length to approximate the form of the character. It has been found that the length of lines may vary over a range of 1.5:1 within any character and vary over a range of as much as 3:1 for all symbols.

The circuit 100 shown in FIG. 7 generates the triangular waveforms and is capable of maintaining a constant writing speed by adjusting the period of each slope of the triangular waveform to be proportional to the length of the written line, i.e. proportional to $\Delta X^2 + \Delta Y^2$. The slope of the pulse is adjusted by the value of the current from constant current sources 102 and 104. The constant current sources 102 and 104 are in turn controlled by voltages $V_s$ and $V_t$. These voltages $V_s$ and $V_t$ determine the periods of each line segment and are changed with each segment to reflect its period.

The constant current sources 102 and 104 are triggered from the output from a pair of comparators 106 and 108 which have as one input reference level signals $+V_H$ and 0 respectively. The comparators 106 and 108 are connected to a flip-flop 110 whose outputs are connected to the constant current sources 102 and 104 via leads 112 and 114 respectively. When $+V_H$ is applied to comparator 106, flip-flop 110 switches to a "1" on lead 114 to trigger the source 104, thereby permitting passage of $V_t$. The value of the signal $+V_H$ only effects the size of the character and has no effect on the writing speed which remains constant. When the 0 reference level is applied to comparator 108, flip-flop 110 switches to a "1" on lead 112 to trigger the source 102, thereby permitting passage of $V_s$.

The output from the source 102 or 104 whichever is triggered is applied to an integrator 116 which integrates the signal. The output from integrator 116 is a triangular waveform and is applied to comparators 106 and 108 to provide the proper comparison for the switching of flip-flop 110 at the appropriate times. The output from the integrator 116 provides the phase B triangular waveform. The phase A triangular waveform is obtained by applying the output from integrator 116 to an amplifier 118 which has an offset voltage $-V_H$ applied thereto. This operation ensures that both phase A and B waveforms move in a positive direction from the zero level. The amplifier acts to split the phase of the triangular waveform from integrator 116 and may be either a phase inverting amplifier or a differential amplifier.

The circuit 100 for generating the triangular waveforms is triggered in the same way as the circuit shown in dotted block 22 in FIG. 1. A start signal is applied to a hold circuit when the cycle starts to get a burst of triangular pulses on the command START. The hold circuit 120 applies signals to a shift register 122 which proceeds through the 16 character line segments in the same manner as the counter 52 and decoder 54 in FIG. 1. The outputs from the shift register 122 sequentially provide the control signals to the segment commutation gates 50.

The circuit 100 instead of providing a constant writing speed in the manner described above, may be employed to reduce the range of writing speed variation from 3:1 to about 1.5:1 by changing the pulse periodicity to suit a character. Under this arrangement all segments within a character have a similar period of time. This correction is achieved by having the symbol decoder 80 select the character switch (Sl–Sn) and select the appropriate voltage for $V_s$ and $V_t$.

A new method and circuitry for generating symbols has been described which offers many advantages over more conventional techniques. These advantages include flexibility of character size and speed. The size of the symbol being generated is controlled by the segment period $T_S$. The display writing speed may be maintained constant, thus avoiding special brightness compensation circuits to cope with different sized symbols. In addition, the same basic character generator can operate over a wide range of symbol speeds. The terminal amplitudes of each segment can be accurately determined through the use of the input resistors to the summing amplifiers. The invention also permits the generator to have a variable symbol periodicity so that simple characters are allowed fewer segments than more complex ones. Variable symbol periodicity provides savings in nonwriting time, which may be traded for higher brightness, increased data capacity or slower major deflection speeds. In addition, ringing and other spurious effects are minimized in the present invention since segment commutation is achieved by gating a triangular pulse train where the actual switching takes place when the waveform is at zero.

As an extension of the present invention, one symbol generator could service several displays, because all characters are generated simultaneously. The display address and character selection would be achieved by a triple crossbar switch configuration. Of course, all displays would be locked to the same clock and access timing and access delay would average half the total character period.

It should be understood, of course, that the foregoing disclosure relates to only the preferred embodiments of the invention and that numerous modifications or alterations may be made therein without departing from the spirit and the scope of the invention as set forth in the appended claims.

1. A constant speed character generator comprising:
   means for generating a pair of triangular waveforms said waveforms being of varying periodicity;
   means for gating the waveforms so as to commutate them into separate X- and Y-axis signals;
   means for separately and sequentially summing the gated X- and Y-axis signals, said summing means including means for controlling the brightness of the generated characters;
   means coupled to the outputs of said summing means for selecting the character segments to be generated; and
   means for providing an output which contains signals representing straight line segments joining two points of a waveform resulting from summing the correct proportions of the positive and negative going ramps of the triangular waveforms.

2. A generator as set forth in claim 1 wherein said generating means includes:
   a square wave generator;
   a clock signal fed into said square wave generator;
   a pair of integrators connected to the output of said square wave generator, the outputs of said integrators being the displaced triangular waveforms; and
   a feedback loop including a drift correction circuit associated with each integrator.

3. A generator as set forth in claim 1 wherein said generating means includes:
   a pair of comparator circuits each receiving a different reference signal;
   a switching circuit connected to the outputs of said comparators;
   a pair of constant current sources connected to the output of said switching circuit, said constant current sources being supplied with signals which determine the character segment periods;
   an integrator receiving a parallel connected output signal from said constant current sources, the output from said integrator being fed to each of said comparators; and
   a phase splitting amplifier having an offset voltage applied thereto, said amplifier being connected to the output of said integrator, whereby the outputs from said amplifier and integrator represent the displaced triangular waveforms.

4. A generator as set forth in claim 1 wherein said means for gating the waveforms includes:
   a counter which receives a clock signal and a start signal;
   a decoder connected to the output of said counter for separating the signals corresponding to each character segment; and
   a plurality of gating circuits to which the segment gate control signals from the decoder and the triangular waveforms are applied.

5. A generator as set forth in claim 1 wherein said summing means includes:
   separate X- and Y-summing amplifiers associated with each character; and
   a plurality of input resistors connected between each of said summing amplifiers and the gating means for controlling the input from said gating means into said summing amplifiers.

6. A generator as set forth in claim 1 wherein said selecting means includes:
   symbol select gates connected to each of the summed X- and Y-axis signals from said summing means; and
   a symbol decoder having an input which represents the symbol selection code, the outputs of said decoder being applied to said symbol selection gates.

7. A generator as set forth in claim 1 wherein said brightness control means includes:
   a separate Z-axis summing amplifier associated with each character;
   a counter receiving a clock signal and a start signal;
   a decoder connected to the output of said counter for supplying brightness control signals to the Z-amplifiers; and
   a plurality of input resistors connected between the decoder and each of the Z-amplifiers for controlling the brightness signals applied thereto.

8. A constant speed character generator comprising:
   means for generating a pair of triangular waveforms said waveforms being of varying periodicity, said generating means including a square wave generator and a pair of integrators connected in parallel to the output of said generator, said integrators providing the displaced triangular waveforms;
   means for gating the waveforms of varying periodicy so as to commutate them into separate X and Y axis signals, said gating means including a plurality of gating circuits to which the triangular waveforms and character segment gate control signals are applied;

means for separately and sequentially summing the gated X- and Y-axis signals, said summing means including separate X- and Y-axis summing amplifiers associated with each separate character and each receiving an input from each of said gating circuits, said summing means further including means for controlling the brightness of the line segments, said brightness control means including a separate Z-axis summing amplifier for each character;

means coupled to the output of said summing means for selecting the character segments to be generated, said selecting means including symbol selection gates connected to each of the X- and Y-axis summing amplifiers; and means including said means coupled to the output of said summing means for providing an output which contains signals representing straight line segments joining two points of a waveform resulting from summing the correct proportions of the positive and negative going ramps of the triangular waveforms.

9. A constant speed character generator comprising:

means for generating a pair of triangular waveforms of varying periodicity said generating means including a pair of constant current sources to which control voltages which determine the line segment periods are applied, an integrator connected to the output of said constant current sources, a phase splitting amplifier having an offset voltage applied thereto being connected to the output of said integrator such that the outputs from said amplifier and said integrator provide the displaced triangular waveforms;

means for gating the waveforms of varying periodicity so as to commutate them into separate X- and Y-axis signals, said gating means including a plurality of gating circuits to which the triangular waveforms and character segment gate control signals are applied;

means for separately and sequentially summing the gated X- and Y-axis signals, said summing means including separate X- and Y-axis summing amplifiers associated with each separate character and each receiving an input from each of said gating circuits, said summing means further including means for controlling the brightness of the generated line segments, said brightness control means including a separate Z-axis summing amplifier for each character;

means coupled to the output of said summing means for selecting the character segments to be generated, said selecting means including symbol selection gates connected to each of the X- and Y-axis summing amplifiers; and means including said means coupled to the output of said summing means for providing an output which contains signals representing straight line segments joining two points of a waveform resulting from summing the correct proportions of the positive and negative going ramps of the triangular waveform.

10. An analog character generator comprising:

means for generating a pair of triangular waveforms displaced from each other in phase, said generator means including, a square wave generator, a clock signal fed into said square wave generator, a pair of integrators connected to the output of said square wave generator, the outputs of said integrators being the displaced triangular waveforms, and a feedback loop including a drift correction circuit associated with each integrator;

means for gating the waveforms so as to commutate them into separate X- and Y-axis signals, said means for gating the waveforms including, a counter which receives a clock signal and a start signal, a decoder connected to the output of said counter for separating the signals corresponding to each character segment, and a plurality of gating circuits to which segment gate control signals from the decoder and the triangular waveforms are applied;

means for separately and sequentially summing the gated X- and Y-axis signals, said summing means including, separate X- and Y-summing amplifiers associated with each character, and a plurality of input resistors connected between each of said summing amplifiers and the gating means for controlling the input from said gating means into said summing amplifiers;

means coupled to the outputs of said summing means for selecting the character segments to be generated, said selecting means including, a symbol selection gate connected to each of the summed X- and Y-axis signals from said summing means, and a symbol decoder having an input which represents the symbol selection code, the outputs of said decoder being applied to said symbol selection gates;

means for providing an output which contains signals representing straight line segments joining two points of a waveform resulting from summing the correct proportions of the positive and negative going ramps of the triangular waveforms; and means coupled to said output means for controlling the brightness of the line segments, said brightness control means including, a separate Z axis summing amplifier associated with each character, a counter receiving a clock signal and a start signal, a decoder connected to the output of said counter for supplying brightness control signals to the Z amplifiers, and a plurality of input resistors connected between the decoder and each of the Z amplifiers for controlling the brightness signals applied thereto.

11. An analog character generator comprising:

means for generating a pair of triangular waveforms displaced from each other in phase, said generator means including, a pair of comparator circuits each receiving a different reference signal, a switching circuit connected to the outputs of said comparators, a pair of constant current sources connected to the output of said switching circuit, said constant current sources being supplied with signals which determine the character segment periods, an integrator receiving a parallel connected output signal from said constant current sources, the output from said integrator being fed to each of said comparators, and a phase splitting amplifier having an offset voltage applied thereto, said amplifier being connected to the output of said integrator, whereby the outputs from said amplifier and integrator represent the displaced triangular waveforms;

means for gating the waveforms so as to commutate them into separate X- and Y-axis signals, said means for gating the waveforms including, a counter which receives a clock signal and a start signal, a decoder connected to the output of said counter for separating the signals corresponding to each character segment, and a plurality of gating circuits to which segment gate control signals from the decoder and the triangular waveforms are applied;

means for separately and sequentially summing the gated X- and Y-axis signals, said summing means including, separate X- and Y-summing amplifiers associated with each character, and a plurality of input resistors connected between each of said summing amplifiers and the gating means for controlling the input from said gating means into said summing amplifiers;

means coupled to the outputs of said summing means for selecting the character segments to be generated, said selecting means including, symbol selection gates connected to each of the summed X- and Y-axis signals from said summing means, and a symbol decoder having an input which represents the symbol selection code, the outputs of said decoder being applied to said symbol selection gates;

means for providing an output which contains signals representing straight line segments joining two points of a waveform resulting from summing the correct proportions of the positive and negative going ramps of the triangular waveforms; and means coupled to said output means for controlling the brightness of the line segments, said brightness control means including, a separate Z-axis summing amplifier associated with each character, a counter receiving a clock signal and a start signal, a decoder connected to the output of said counter for supplying brightness control signals to the Z amplifiers, and a plurality of input resistors connected between the decoder and each of the Z amplifiers for controlling the brightness signals applied thereto.

* * * * *